United States Patent
Hiller et al.

(10) Patent No.: US 10,620,293 B2
(45) Date of Patent: Apr. 14, 2020

(54) DETERMINING DIRECTION OF ARRIVAL OF AN ELECTROMAGNETIC WAVE

(71) Applicant: THE BOEING COMPANY, Chicago, IL (US)

(72) Inventors: Nathan D. Hiller, Irvine, CA (US); Kurt Loheit, Rancho Palos Verdes, CA (US)

(73) Assignee: THE BOEING COMPANY, Chicago, IL (US)

( * ) Notice: Subject to any disclaimer, the term of this patent is extended or adjusted under 35 U.S.C. 154(b) by 219 days.

(21) Appl. No.: 15/802,026

(22) Filed: Nov. 2, 2017

(65) Prior Publication Data
US 2019/0128993 A1    May 2, 2019

(51) Int. Cl.
| | |
|---|---|
| *G01S 3/00* | (2006.01) |
| *H01Q 21/06* | (2006.01) |
| *G01S 3/04* | (2006.01) |
| *H01Q 25/00* | (2006.01) |
| *H01Q 9/04* | (2006.01) |
| *H01Q 3/28* | (2006.01) |

(52) U.S. Cl.
CPC ............ *G01S 3/00* (2013.01); *G01S 3/043* (2013.01); *H01Q 9/0485* (2013.01); *H01Q 21/06* (2013.01); *H01Q 25/00* (2013.01); *H01Q 3/28* (2013.01)

(58) Field of Classification Search
CPC ... G01S 3/00; G01S 3/043; G01S 3/06; G01S 3/14; G01S 3/143; H01Q 25/00; H01Q 21/06; H01Q 9/0485; H01Q 3/28
See application file for complete search history.

(56) References Cited

U.S. PATENT DOCUMENTS

| | | |
|---|---|---|
| 4,386,355 A | 5/1983 | Drew et al. |
| 4,746,924 A | 5/1988 | Lightfoot |
| 9,559,417 B1 | 1/2017 | Schwarzwalder |
| 2012/0229339 A1* | 9/2012 | Higgins .................. G01S 3/04 342/449 |
| 2013/0139598 A1 | 6/2013 | Sohn et al. |

OTHER PUBLICATIONS

Zhao et al., Tunable Silicon-Based All-Dielectric Metamaterials With Strontium Titanate Thin Film in Terahertz Range, Sep. 4, 2017, Optics Express, vol. 25, No. 18, pp. 22158-22163 (Year: 2017).*

Teich, et al., "Fundamentals of Photonics (2nd ed.)," Canada, Wiley Interscience 3, 2007, Chapter 8 Guided-Wave Optics, pp. 315-320.

* cited by examiner

*Primary Examiner* — Toan M Le
(74) *Attorney, Agent, or Firm* — Moore Intellectual Property Law, PLLC

(57) ABSTRACT

A system for direction of arrival determination includes a waveform detector and processing circuitry. The waveform detector includes a first pair of dielectric structures and a second pair of dielectric structures. The processing circuitry is configured to determine a direction of arrival of an electromagnetic wave incident on the waveform detector. The direction of arrival is determined based on relative power levels in the first pair of dielectric structures responsive to the electromagnetic wave and based on relative power levels in the second pair of dielectric structures responsive to the electromagnetic wave.

27 Claims, 7 Drawing Sheets

1st Ratio = 1.0    2nd Ratio = 1.0

1st Mapping Data

2nd Mapping Data

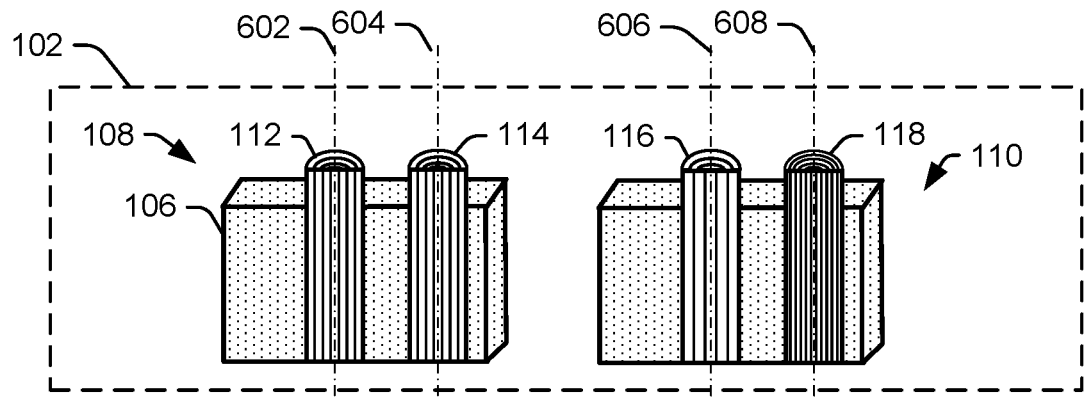
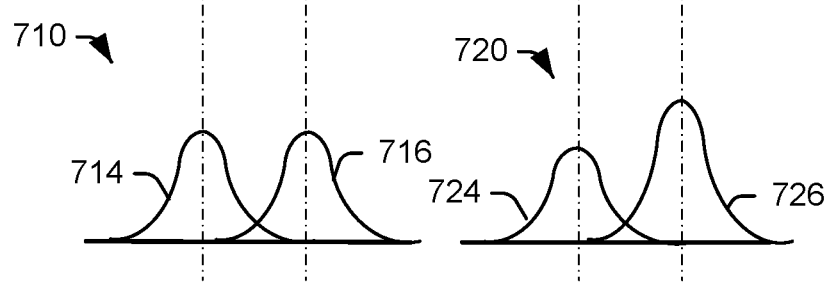
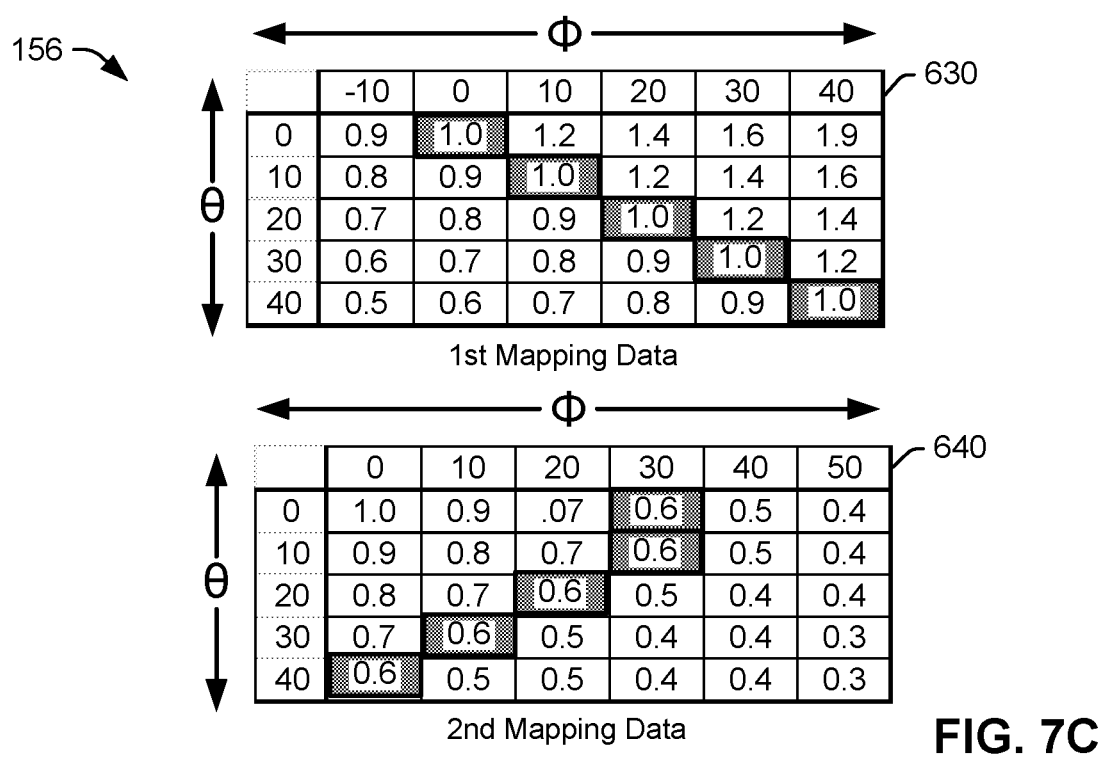
FIG. 7A
FIG. 7B
FIG. 7C

DETERMINING DIRECTION OF ARRIVAL OF AN ELECTROMAGNETIC WAVE

FIELD

The present disclosure generally relates to devices, systems, and methods for determining a direction of arrival of an electromagnetic wave.

BACKGROUND

Many technologies use electromagnetic waves for communication, detection and ranging, offensive or defensive purposes, etc. Some of these technologies rely on or can be improved by determination of the direction of arrival of an electromagnetic wave. For example, some communication systems use a directional antenna, such as a parabolic dish, to provide directional control of a transmitted electromagnetic wave or to selectively receive an electromagnetic wave from a particular direction. Such antennas are referred to as "directional" because they are configured to focus electromagnetic waves along a pointing direction (corresponding, for example, to a narrow range of directions of arrival) of the antenna. Some directional antennas are repositionable to change the pointing direction of the directional antenna. Such repositionable directional antennas can be used to estimate a direction of arrival of an electromagnetic wave, since the direction of arrival of the electromagnetic wave corresponds to pointing direction of the repositionable directional antenna when the electromagnetic wave is received. As an example, for a directional antenna that uses a parabolic dish, the parabolic dish alone is generally sized to have a radius of between one quarter (¼) of a wavelength of a target electromagnetic wave and one (1) wavelength of a target electromagnetic wave. Further, a receiver or transmitter is positioned at a focal point of the parabolic dish to receive or transmit a signal. Further, if the directional antenna is repositionable, an actuator, gimbals, or other pointing support equipment may be coupled to the parabolic dish. Thus, a repositionable directional antenna system can be relatively large, heavy, and expensive.

Rather than physically repositioning a directional antenna, some systems use an array of radiating elements, which may be stationary or movable, and use beamforming techniques to electronically control a pointing direction of the array. In such systems, each radiating element is a small antenna (e.g., a conductor); therefore, each radiating element re-radiates some energy that it receives from an electromagnetic wave. Re-radiation from the radiating elements of the array is a source of noise that can limit a signal to noise ratio (SNR) or a detection limit of the array or nonlinearity signal distortions. Further, such arrays can be sized such that spacing between adjacent radiating elements is greater than one quarter (¼) of a wavelength of a target electromagnetic wave. Thus, arrays with many radiating elements can be relatively large and heavy. Also, beamforming techniques used for electronically pointing such arrays can be computationally complex and require that each radiating element have support hardware, such as a phase shifter and/or amplifier, to provide directional control.

Accordingly, while determining direction of arrival of electromagnetic waves is important for many technologies, available systems for determining direction of arrival tend to be large, heavy, complex, and/or expensive.

SUMMARY

In a particular embodiment, a system for direction of arrival determination includes a waveform detector and processing circuitry. The waveform detector includes a first pair of dielectric structures and a second pair of dielectric structures. The processing circuitry is configured to determine a direction of arrival of an electromagnetic wave incident on the waveform detector. The direction of arrival is determined based on relative power levels in the first pair of dielectric structures responsive to the electromagnetic wave and based on relative power levels in the second pair of dielectric structures responsive to the electromagnetic wave.

In another particular embodiment, a waveform detector includes a first pair of dielectric structures including a first dielectric structure disposed within a threshold distance of a second dielectric structure. The waveform detector also includes a second pair of dielectric structures including a third dielectric structure disposed within the threshold distance of a fourth dielectric structure. The threshold distance such that relative power levels, responsive to an electromagnetic wave, in the first pair of dielectric structures are related to a direction of arrival of the electromagnetic wave and such that relative power levels, responsive to the electromagnetic wave, in the second pair of dielectric structures are related to the direction of arrival of the electromagnetic wave.

In another particular embodiment, a method of direction of arrival determination includes receiving, at a processor from a sensor system, one or more first signals indicative of relative power levels, responsive to an electromagnetic wave, in a first pair of dielectric structures of a waveform detector. The method also includes receiving, at the processor from the sensor system, one or more second signals indicative of relative power levels, responsive to the electromagnetic wave, in a second pair of dielectric structures of the waveform detector. The method also includes determining, by the processor, a direction of arrival of the electromagnetic wave based on the relative power levels in the first pair of dielectric structures and the relative power levels in the second pair of dielectric structures.

The described features, functions, and advantages may be achieved independently in various embodiments or may be combined in yet other embodiments further details of which can be seen with reference to the following description and drawings.

BRIEF DESCRIPTION OF THE DRAWINGS

FIGS. 7A and 7B are diagrams illustrating power levels a waveform detector of the system of FIG. 1 responsive to a second electromagnetic wave;

FIG. 7C is a diagram illustrating mapping data that maps the power levels of FIGS. 7A and 7B to directions of arrival of the second electromagnetic wave.

DETAILED DESCRIPTION

Figure 1:
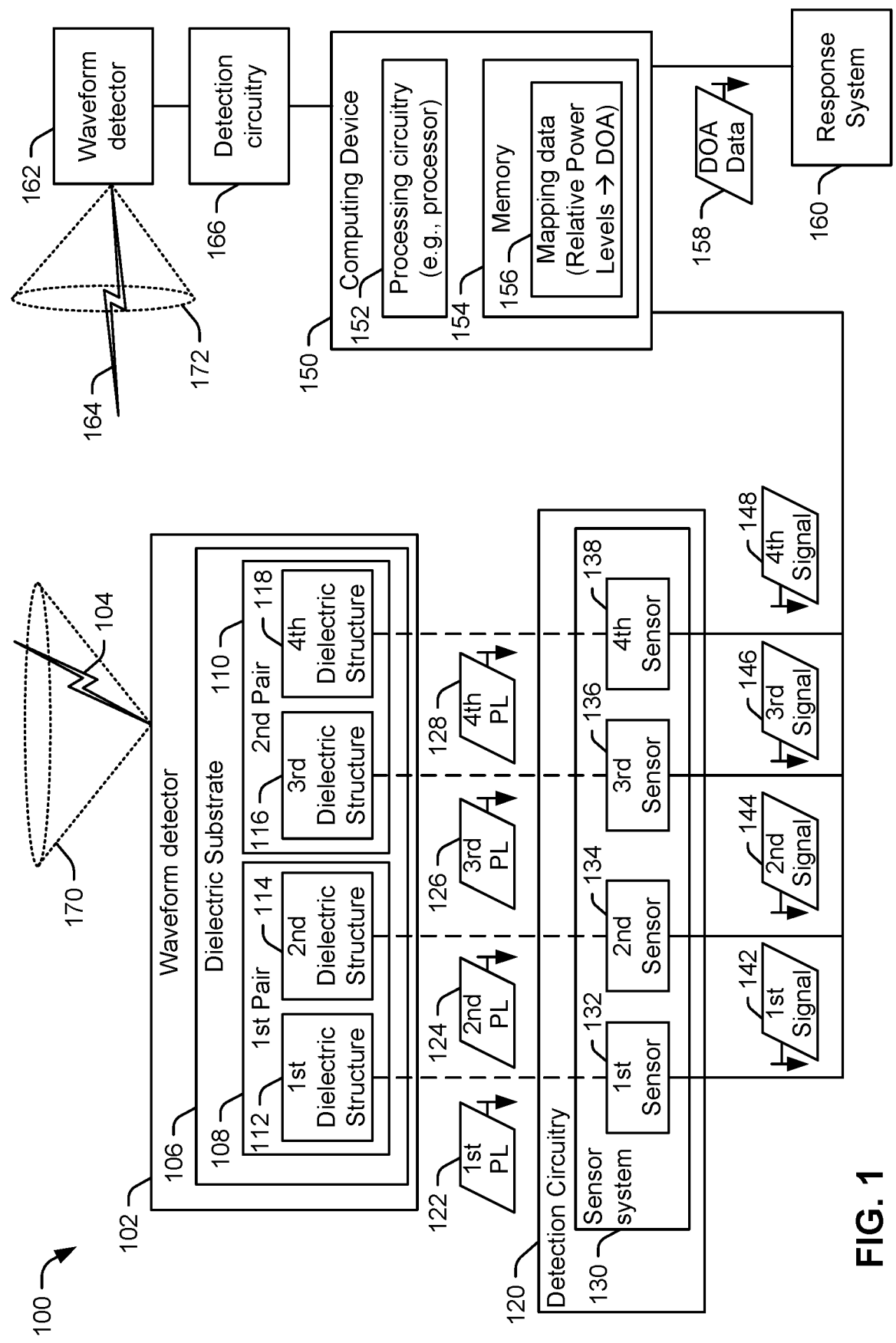
FIG. 1 is a block diagram illustrating a particular embodiment of a system for determining a direction of arrival of an electromagnetic wave.

As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

Particular embodiments disclosed herein include a waveform detector that includes multiple pairs of coupled dielectric structures. In this context, "coupling" refers to transferring energy without direct contact. Coupling in this sense is also referred to herein as "electromagnetic coupling" where such terminology may avoid confusion with "coupling" in the physical sense (e.g., direct or indirect physical contact). A pair of dielectric structures of the waveform detector are said to be "coupled" (e.g., electromagnetically coupled) if a first dielectric structure of the pair generates a field, responsive to an electromagnetic wave, that interacts with a second dielectric structure of the pair to transfer energy from the first dielectric structure to the second dielectric structure. Whether two dielectric structures are coupled depends on relative positions, geometries, and material properties of the dielectric structures. The relative power levels in a coupled pair of dielectric structures depends on many factors including the direction of arrival of the electromagnetic wave from which the energy is derived.

While the direction of arrival of the electromagnetic wave affects the relative power level in each dielectric structure of a coupled pair, the relative power levels of a single pair of coupled dielectric structures only provides enough information to determine a direction of arrival of the electromagnetic wave as lying along a first arc or great circle of a unit sphere. A second coupled pair of dielectric structures can be added to the waveform detector to enable determination of the direction of arrival along a second arc or great circle of the unit sphere. An intersection of the first arc or great circle and the second arc or great circle corresponds to a direction of arrival of the electromagnetic wave. Thus, using two pairs of dielectric structures enables determination of the direction of arrival in two spherical dimensions (which can be transformed to a unit vector in a three dimensional Cartesian coordinate system). Accordingly, in a particular implementation, a waveform detector includes two pairs of dielectric structures. In such implementations, a first pair of dielectric structures includes a first dielectric structure and a second dielectric structure disposed within a coupling distance of first dielectric structure. A second pair of dielectric structures includes a third dielectric structure and a fourth dielectric structure disposed within a coupling distance of third dielectric structure. In such implementations, a relative power level in the first pair of dielectric structures is indicative of a first set of possible directions of arrival (e.g., a set of azimuth angles and a set of polar angles), and the relative power level in the second pair of dielectric structures is indicative of a second set of possible directions of arrival (e.g., a set of azimuth angles and a set of polar angles). A particular azimuth angle and polar angle at which the first set of possible directions of arrival intersects the second set of possible directions of arrival corresponds to a direction of arrival of the electromagnetic wave.

In some implementations, the waveform detector is an "all dielectric waveform detector" in which the pairs of dielectric structures are embedded in a dielectric substrate. In such implementations, the all dielectric waveform detector does not include any conductive components, and therefore, no re-radiation of the electromagnetic wave occurs. Re-radiation of the electromagnetic wave can be a significant source of noise, nonlinear signal distortions, or interference. By using dielectric structures, the waveform detector has improved signal-to-noise characteristic compared to conventional antennas. Also, the waveform detector can be significantly smaller than a wavelength of a target electromagnetic waveform. For example, a waveform detector sized to detect an electromagnetic wave having a wavelength of about 1 meter can use pairs of cylindrical dielectric structures including strontium titanate ($SrTiO_3$) crystal rods, where each rod has a diameter of about 1.00 inch (0.0254 meter) and a length of about 4.00 inches (0.102 meters). In this example, a coupled pair of the rods may be positioned less than about 4.00 inches (0.102 meters) from one another, such as about 3.5 inches (0.089 meters) apart center-to-center.

FIG. 1 is a block diagram illustrating a particular embodiment of a system 100 for determining a direction of arrival of an electromagnetic wave. The system 100 includes a waveform detector 102 and detection circuitry 120 associated with the waveform detector 102. In the particular implementations illustrated in FIG. 1, the system 100 also includes a computing device 150 communicatively coupled to the detection circuitry 120. In this implementation, the computing device 150 includes processing circuitry 152 (e.g., a processor) and a memory 154. In other implementations, the processing circuitry 152 includes or corresponds to a special purpose circuit, such as an applications specific integrated circuit or a field programmable gate array. The processing circuitry 152 is configured to determine a direction of arrival of an electromagnetic wave 104 incident on the waveform detector 102, as explained further below.

The waveform detector 102 includes a first pair 108 of dielectric structures and a second pair 110 of dielectric structures at least partially embedded in a dielectric substrate 106. In FIG. 1, the first pair 108 of dielectric structure includes a first dielectric structure 112 and a second dielectric structure 114. As described in more detail below, the first dielectric structure 112 and a second dielectric structure 114 are configured to exchange energy derived from a waveform (e.g., the electromagnetic wave 104) with one another via electromagnetic coupling. For example, the first dielectric structure 112 and the second dielectric structure 114 are disposed within a threshold distance from one another, where the threshold distance corresponds to a coupling distance for the electromagnetic wave 104. The second dielectric structure 114 may also be substantially phase matched with the first dielectric structure 112. In this context, two dielectric structures are "phase matched" if the electromagnetic wave travels the same speed in each, or if the effective refractive index of one of the dielectric structures is equal to the effective refractive index of the other dielectric structures.

The second pair 110 of dielectric structures includes a third dielectric structure 116 and a fourth dielectric structure 118. The third dielectric structure 116 and the fourth dielectric structure 118 are configured to exchange energy derived from the electromagnetic wave 104 with one another via electromagnetic coupling. For example, the third dielectric structure 116 and the fourth dielectric structure 118 are disposed within the threshold distance (e.g., the coupling distance for the electromagnetic wave 104) from one another. The fourth dielectric structure 118 may also be substantially phase matched with the third dielectric structure 116.

The first pair 108 of dielectric structures and the second pair 110 of dielectric structures are configured to limit or eliminate electromagnetic coupling between the pairs 108, 110. In a particular implementation, electromagnetic coupling between the pairs 108, 110 is limited based on distance between the pairs 108, 110. In such implementations, the first pair 108 of dielectric structures is sufficiently far from the second pair 110 of dielectric structures that little or no detectable energy is exchanged between the pairs 108, 110 of dielectric structures via electromagnetic coupling. For example, the first dielectric structure 112 and the second dielectric structure 114 are each disposed further than the threshold distance from each of the third dielectric structure 116 and the fourth dielectric structure 118. Thus, the first pair 108 of dielectric structures is not electromagnetically coupled to the second pair 110 of dielectric structures. In other implementations, electromagnetic coupling between the pairs 108, 110 is limited based coupling properties of the dielectric structures, as described further with reference to FIG. 3.

The first dielectric structure 112 is aligned with the second dielectric structure 114 along a first axis, and the third dielectric structure 116 is aligned with the fourth dielectric structure 118 aligned along a second axis that is non-parallel with the first axis. Each of the dielectric structures 112-118 has a major axis that extends in a direction along which electromagnetic coupling between pairs of dielectric structures occurs. To illustrate, in some implementations, each dielectric structure 112-118 has a cylindrical (or rod) shape having a major axis that extends from a center of one circular face of the cylindrical shape to a center of the other circular face of the cylindrical shape. In such implementations, the major axis of the first dielectric structure 112 is substantially (e.g., within manufacturing tolerances) parallel with the major axis of the second dielectric structure 114, and the major axis of the third dielectric structure 116 is substantially (e.g., within manufacturing tolerances) parallel with the major axis of the fourth dielectric structure 118. The first axis, along which the first and second dielectric structures 112, 114 are aligned, corresponds to a line drawn through the major axis of the first dielectric structure 112 and the major axis of the second dielectric structure 114. Likewise, the second axis, along which the third and fourth dielectric structures 116, 118 are aligned, corresponds to a line drawn through the major axis of the third dielectric structure 116 and the major axis of the fourth dielectric structure 118. Arranging the first axis nonparallel to the second axis enables determining the direction of arrival of the electromagnetic wave 104 in two dimensions of a spherical coordinate system, as described further with reference to FIGS. 6 and 7.

To enhance electromagnetic coupling, the first dielectric structure 112 is substantially (e.g., within manufacturing tolerances) identical to the second dielectric structure 114 in terms of size, shape, and material properties. To illustrate, the first dielectric structure 112 has a first size and a first shape, and the second dielectric structure 114 has a second size and a second shape, where the first size is substantially equal to the second size, and the first shape is geometrically similar to the second shape. Likewise, to enhance electromagnetic coupling, the third dielectric structure 116 is substantially (e.g., within manufacturing tolerances) identical to the fourth dielectric structure 118 in terms of size, shape, and material properties. To illustrate, the third dielectric structure 116 has a third size and a third shape, and the fourth dielectric structure 118 has a fourth size and a fourth shape, where the third size is substantially equal to the fourth size, and the third shape is geometrically similar to the fourth shape. The first and second dielectric structures 112, 114 may be substantially identical to the third and fourth dielectric structures 116, 118 for ease of manufacturing; however, such similarity is not needed for the waveform detector 102 to function properly and efficiently since first and second dielectric structures 112, 114 do not exchange energy via electromagnetic coupling with the third and fourth dielectric structures 116, 118.

Electromagnetic capture, guiding, and coupling is affected by differences in properties of the dielectric substrate 106 and the dielectric structures 112-118. To enhance electromagnetic coupling, each of the dielectric structures 112-118 has a relative permittivity greater than a relative permittivity of the dielectric substrate 106. Further, to enhance electromagnetic coupling, each of the dielectric structures 112-118 has a refractive index that is greater than a refractive index of the dielectric substrate 106. For example, in a particular implementation, the dielectric structures 112-118 include a material with high relative permittivity and high refractive index, such as strontium titanate ($SrTiO_3$) crystals, and the dielectric substrate 106 includes a material with a lower relative permittivity and a lower refractive index, such as a polymer, a glass, or silicon.

Due to the arrangement and properties of the first and second dielectric structures 112, 114, when the electromagnetic wave 104 interacts with the first pair 108 of dielectric structures, energy of the electromagnetic wave 104 is focused by the first and second dielectric structures 112, 114 and coupled between the first and second dielectric structures 112, 114. Likewise, when the electromagnetic wave 104 interacts with the second pair 110 of dielectric structures, energy of the electromagnetic wave 104 is focused by the third and fourth dielectric structures 116, 118 and coupled between the third and fourth dielectric structures 116, 118. The electromagnetic coupling between each pair 108, 110 of dielectric structures is a function of (e.g., depends on) the direction of arrival of the electromagnetic wave 104. For example, if the electromagnetic wave 104 is a plane wave and the direction of arrival of the electromagnetic wave 104 is from directly above the first pair 108 of dielectric structures, the electromagnetic wave 104 strikes both the first and second dielectric structures 112, 114 at the same time (and with the same phase), and the electromagnetic coupling is balanced. However, if the electromagnetic wave 104 is a plane wave and the direction of arrival of the electromagnetic wave 104 is at an angle such that the electromagnetic wave 104 strikes one of the first or second dielectric structures 112, 114 before (and with a different phase) the other dielectric structure, the electromagnetic coupling within the first pair 108 of dielectric structures will be unbalanced in favor of either the first or second dielectric structures 112, 114. Relative power levels (e.g., a ratio of power levels) in the first pair 108 of dielectric structures indicate how unbalanced the electromagnetic coupling is within the first pair 108 of dielectric structures. Thus, power levels within each dielectric structure 112, 114 of the first pair 108 of dielectric structures can be measured (directly or indirectly) to determine possible directions of arrival of the electromagnetic wave 104.

Each possible direction of arrival determined based on the relative power levels in the first pair 108 of dielectric structures corresponds to a direction of arrival within a particular two-dimensional (2D) plane. Relative power levels (e.g., a ratio of power levels) in the second pair 110 of dielectric structures can be measured to determine possible directions of arrival of the electromagnetic wave 104 in a second 2D plane. By measuring the direction of arrival in two non-parallel 2D planes, the three-dimensional (3D) direction of arrival can be determined based on an intersection point at which the two 2D directions of arrival agree.

In the implementation illustrated in FIG. 1, the detection circuitry 120 includes a sensor system 130. In other implementations, such as the implementation illustrated in FIGS. 4A and 4B, sensors of the sensor system 130 are part of the waveform detector 102 and are in direct physical and electrical contact with the dielectric structures 112-118. The sensor system 130 includes a plurality of sensors 132-138 configured to measure or estimate power levels 122-128 of the dielectric structures 112-118 responsive to the electromagnetic wave 104. In FIG. 1, the sensor system 130 includes a first sensor 132, a second sensor 134, a third sensor 136, and a fourth sensor 138. The first sensor 132 is configured to generate a first signal 142 indicative of a first power level 122, responsive to the electromagnetic wave 104, in the first dielectric structure 112. The second sensor 134 is configured to generate a second signal 144 indicative of a second power level 124, responsive to the electromagnetic wave 104, in the second dielectric structure 114 of the first pair 108 of dielectric structures. The third sensor 136 is configured to generate a third signal 146 indicative of a third power level 126, responsive to the electromagnetic wave 104, in the third dielectric structure 116 of the second pair 110 of dielectric structures. The fourth sensor 138 is configured to generate a fourth signal 148 indicative of a fourth power level 128, responsive to the electromagnetic wave 104, in the fourth dielectric structure 118 of the second pair 110 of dielectric structures.

Although FIG. 1 illustrates one sensor per dielectric structure, in some implementations, a single sensor may be used for a pair of dielectric structures. Since the direction of arrival determination is based on the relative power levels in the first pair 108 of dielectric structures and the second pair 110 of dielectric structures, a single sensor for each pair of dielectric structures can sense the relative power level in the pair rather than sensing each the power level in each dielectric structure separately. Thus, the relative power levels the first pair 108 of dielectric structures can be calculated (e.g., as a ratio based on the first signal 142 and the second signal 144), or the relative power levels of the first pair 108 of dielectric structures can be measured.

The sensors 132-138 can include contact sensors or non-contact sensors. A contact sensor is connected (e.g., directly physically connected or electrically connected via a conductive member) to a corresponding dielectric structure. For example, the conductive member may convert power in the dielectric structure to an electrical signal, which is measured by the sensor to determine the power level of the dielectric structure. A non-contact sensor uses a non-contact measurement technique to measure a change in a corresponding dielectric structure, where the change is indicative of or correlated with power level in the dielectric structure. Examples of changes that can be detected to indicate power level include a temperature change, a dimensional change (e.g., a change in length), vibration, or a change in an optical property (e.g., refractive index, color, etc.). In yet another example, the power level in a dielectric structure may cause a change in another component (e.g., an indicator coupled to the dielectric structure). In this example, a sensor can measure the change in the other component, where the change is indicative of or correlated with power level in the dielectric structure.

In the implementation illustrated in FIG. 1, the sensors 132-138 provide the signals 142-148 indicative of the power levels 122-128 to the computing device 150. In this implementation, the processing circuitry 152 of the computing device 150 determines the direction of arrival of the electromagnetic wave 104 based on the signals 142-148. For example, the processing circuitry 152 determines relative power levels in the first pair 108 of dielectric structures based on the first signal 142 and the second signal 144. The processing circuitry 152 also determines relative power levels in the second pair 110 of dielectric structures based on the third signal 146 and the fourth signal 148. Alternatively, the sensor system 130 can provide the processing circuitry 152 with one signal per pair 108, 110, where the signal for a particular pair of dielectric structures indicate the relative power levels in the particular pair. To illustrate, the sensor system 130 may provide one signal indicating the relative power levels in the first pair 108 of dielectric structures (e.g., rather than providing the first and second signals 142, 144) and may provide another signal indicating the relative power levels in the second pair 110 of dielectric structures (e.g. rather than providing the third and fourth signals 146, 148).

In some implementations, the processing circuitry 152 calculates the direction of arrival based on the relative power levels using an empirically derived formula. For example, for a particular waveform detector 102 having dimensions as described with reference to FIG. 2A, the direction of arrival can be calculated using the following equation:

$$(-1)^{n-1} \ln\left(\frac{P_{2n-1}}{P_{2n}}\right) = -1.3 \times 10^{-6} \theta^2 \varphi + 3.7 \times 10^{-6} \theta \varphi + 1.46 \times 10^{-2} \varphi - 1.3 \times 10^{-2} \theta (-1)^{n-1}$$

where $P_{2n-1}/P_{2n}$ is the power ratio between a coupled pair dielectric structures, where n=1 for a first coupled pair of dielectric structures and n=2 for a second coupled pair of dielectric structures, and where $\varphi$ is an azimuthal angle and $\theta$ is a polar angle.

The empirically derived formula can be determined by calibrating the system 100 using multiple electromagnetic waves from known directions of arrival. Alternatively, as in the example illustrated in FIG. 1, the processing circuitry 152 can be coupled to a memory 154 storing mapping data 156. In this example, the mapping data 156 includes first mapping data that maps values of the relative power levels in the first pair 108 of dielectric structures (or values of a measurement that is correlated with or indicative of the relative power levels in the first pair 108 of dielectric structures) to first angles of arrival. The mapping data 156 also includes second mapping data that maps values of the relative power levels in the second pair 110 of dielectric structures (e.g., values of a measurement that is correlated with or indicative of the relative power levels in the second pair 110 of dielectric structures) to second angles of arrival. In this example, the processing circuitry 152 determines the direction of arrival data 158 based on the first mapping data and the second mapping data, as described with reference to FIGS. 6 and 7.

After determining the direction of arrival of the electromagnetic wave 104, the processing circuitry 152 or the computing device 150 generates direction of arrival (DOA) data 158 indicating the direction of arrival, and sends the DOA data 158 to a response system 160. The response system 160 is configured to initiate a response action based on the direction of arrival of the electromagnetic wave 104. Examples of response actions include, but are not limited to, generating a notification (e.g., displaying an icon representing the direction of arrival of the electromagnetic wave 104) or generating a steering command to cause a device (e.g., an antenna or a weapons system) to point toward the direction of arrival. In some implementations, a steering command generated based on the DOA data 158 may cause the waveform detector 102 to be repositioned. For example, the waveform detector 102 may be pivoted to cause electromagnetic wave 104 to strike the waveform detector at a different angle to enable taking a second set of measurements to confirm the direction of arrival.

The waveform detector 102 can be used to measure the direction of arrival of electromagnetic waves from a range of azimuth angles and a range of polar angles, which define an acceptance cone 170 of the waveform detector 102. Since the acceptance cone 170 is limited, the system 100 can include one or more additional waveform detectors, such as a second waveform detector 162, and detection circuitry 166 to support the one or more additional waveform detectors. In the example illustrated on FIG. 1, the second waveform detector 162 has a different acceptance cone 172 than the waveform detector 102. Thus, the waveform detector 102 can be used to determine the direction of arrival of electromagnetic waves within a first polar range and a first azimuth angle range (e.g., corresponding to the acceptance cone 170), and the second waveform detector 162 can be used to determine the direction of arrival of electromagnetic waves (e.g., electromagnetic wave 164) within a second polar range and a second azimuth angle range (e.g., corresponding to the acceptance cone 172). In this example, the first polar range is different than the second polar range, and the first azimuth angle range is different than the second azimuth angle range. Although FIG. 1 illustrates two waveform detectors 102, 162, in other implementations, such as the implementations illustrated in FIGS. 4A, 4B, 5A, and 5B, the system 100 includes more than two waveform detectors. In such implementations, the acceptance cone of two or more adjacent waveform detectors can partially overlap to provide a continuous field of view (e.g., an aggregate acceptance cone) over a particular angular range (e.g., 180 degrees, 360 degrees, or some other target angular range).

Figure 2A:
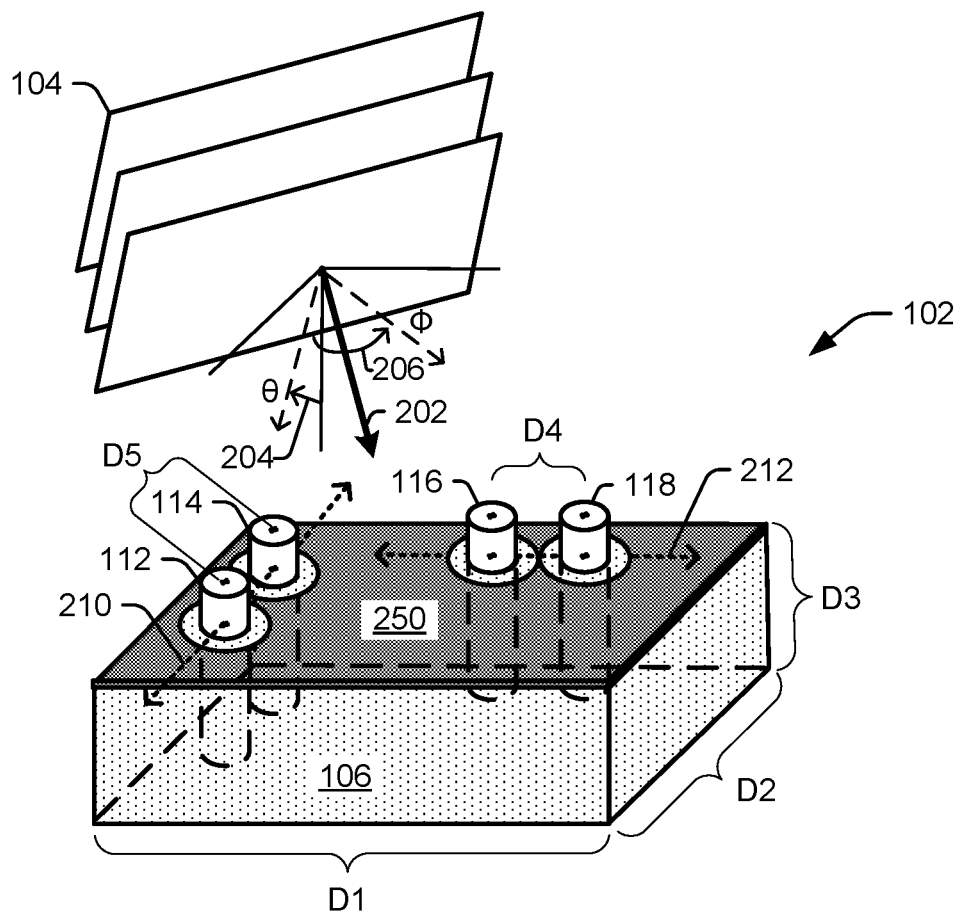
FIGS. 2A, 2B and 2C are diagrams illustrating various views of a particular implementation of a waveform detector of the system of FIG. 1.
Figure 2B:
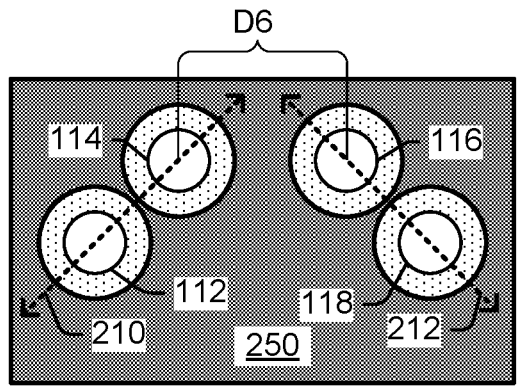
Figure 2C:
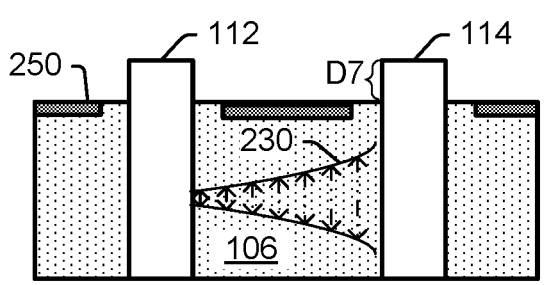

FIGS. 2A, 2B and 2C are diagrams illustrating various views of a particular implementation of the waveform detector 102 of the system of FIG. 1. FIG. 2A illustrates a perspective view of the particular implementation of the waveform detector 102 and the electromagnetic wave 104. FIG. 2B shows a top view of the particular implementation of the waveform detector 102 of FIG. 2A. FIG. 2C shows a cross-sectional view of the particular implementation of the waveform detector 102 of FIG. 2A, where the cross-section is along a line 210 shown in FIG. 2A.

In FIG. 2A, the electromagnetic wave 104 is illustrated as a plane wave with a direction of arrival indicated by a vector 202. The vector 202 can be expressed in spherical coordinates as having a component in an azimuthal direction ($\varphi$, phi) 206 and a component in a polar direction ($\theta$, theta) 204.

In FIGS. 2A, 2B, and 2C, the waveform detector 102 includes the first dielectric structure 112 and the second dielectric structure 114 arranged as a coupled pair (e.g., the first pair 108) of dielectric structures. The waveform detector 102 also includes the third dielectric structure 116 and the fourth dielectric structure 118 arranged as a coupled pair (e.g., the second pair 110) of dielectric structures. Each of the dielectric structures 112-118 is embedded within the dielectric substrate 106 such that a portion of each dielectric structure 112-118 extends external to the dielectric substrate 106.

In the implementation illustrated in FIGS. 2A, 2B, and 2C, the waveform detector 102 also includes an energy absorbing layer 250. The energy absorbing layer 250 is configured to absorb electromagnetic radiation within a target wavelength. In this implementation, interaction of the electromagnetic wave 104 with the dielectric structures 112-118 can cause some diffraction, which can cause interference with determining the direction of arrival of the electromagnetic wave 104. The energy absorbing layer 250 absorbs a diffracted portion of the electromagnetic wave 104 to reduce diffraction interference. In this implementation, each dielectric structure 112-118 extends through an opening in the energy absorbing layer 250. The openings can be sized empirically (e.g., based on testing or simulation) based on the particular materials used to form the waveform detector 102 and based on the target wavelength of the electromagnetic wave 104 to limit diffraction.

Several dimensions (D1-D7) of the waveform detector 102 are labeled in FIGS. 2A and 2B. The dimensions D1, D2 and D3 correspond to a length (D1), a width (D2), and a thickness (D3) of the waveform detector 102. Each of the dimensions D1, D2 and D3 is smaller than a wavelength of the electromagnetic wave 104. To illustrate, for a particular implementation in which the wavelength of a target electromagnetic wave is about 1.0 meter, the dimension D1 may be less than or equal to about 0.41 meters, the dimension D2 may be less than or equal to about 0.23 meters, and the dimension D3 may be less than or equal to about 0.10 meters.

A distance between the third dielectric structure 116 and the fourth dielectric structure 118 is labeled as dimension D4, and a distance between the first dielectric structure 112 and the second dielectric structure 114 is labeled as dimension D5. The dimensions D4 and D5 may be the same, or they may be different. For example, if each of the dielectric structures 112-118 is substantially identical to the other dielectric structures 112-118, the dimensions D4 and D5 may be the same. As an alternative example, if first and second dielectric structures 112, 114 are not substantially identical to the third and fourth dielectric structures 116, 118, the dimension D4 may be different than the dimension D5. The dimension D4 is sufficiently small to enable detectable electromagnetic coupling between the third dielectric structure 116 and the fourth dielectric structure 118, and the dimension D5 is sufficiently small to enable detectable electromagnetic coupling (as illustrated by the field 230 in FIG. 2C) between the first dielectric structure 112 and the second dielectric structure 114.

As labeled in FIG. 2B, a dimension D6 corresponds to a closest distance between two unpaired dielectric structures (e.g., the second dielectric structure 114 and the third dielectric structure 116 in this implementation). The dimension D6 is sufficiently large (e.g., greater than the coupling distance) that little or no detectable electromagnetic coupling occurs between the second dielectric structure 114 and the third dielectric structure 116. How much electromagnetic coupling occurs between two dielectric structures depends on the distance between the dielectric structures, material properties of the dielectric structures, geometry of the dielectric structures, and other factors. Accordingly, the spacing of the dielectric structures (corresponding to the dimensions D4, D5, and D6) and the length of the dielectric structures (corresponding to dimension D3 plus dimension D7, labeled in FIG. 2C) may be determined empirically (e.g., by testing or simulation) for particular combinations of materials, size constraints, and target electromagnetic wavelengths.

In FIGS. 2A and 2B, a first line 210 is shown extending through the center of the first dielectric structure 112 and through the center of the second dielectric structure 114. The first line 210 illustrates alignment of the first dielectric structure 112 and the second dielectric structure 114 along a first axis corresponding to the first line 210. Additionally, a second line 212 extends through the center of the third dielectric structure 116 and through the center of the fourth dielectric structure 118. The second line 212 illustrates alignment of the third dielectric structure 116 and the fourth dielectric structure 118 along a second axis corresponding to the second line 212. As shown in FIGS. 2A and 2B, the first line 210 is not parallel to the second line 212. In some implementations, the first line 210 intersects the second line 212 as a right angle. As explained further with reference to FIGS. 6A-6C and 7A-7C, aligning pairs of dielectric structures along axes that are not parallel facilitates detection of the direction of arrival of the electromagnetic wave 104 in two spherical dimensions.

Figure 3:
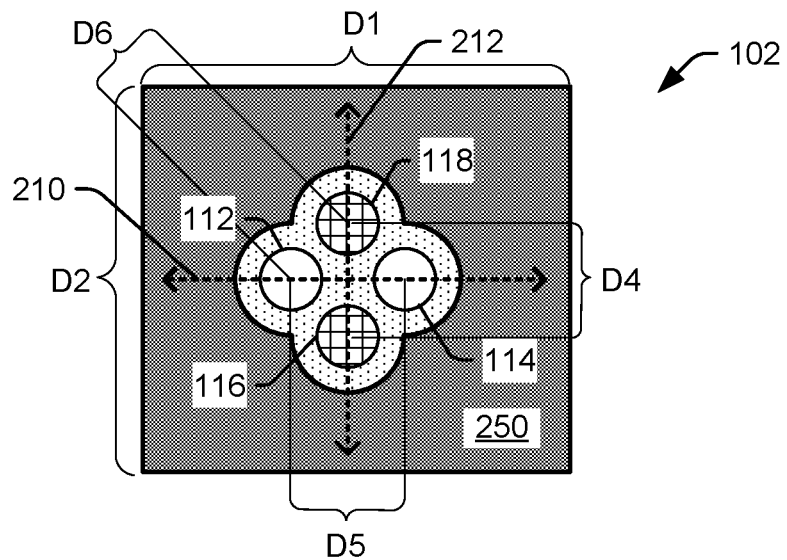
FIG. 3 is a diagram illustrating a top view of a particular implementation of a waveform detector of the system of FIG. 1.

FIG. 3 is a diagram illustrating a top view of another particular implementation of the waveform detector 102 of the system of FIG. 1. The implementation illustrated in FIG. 3 is the same as the implementation illustrated in FIGS. 2A, 2B, and 2C except that the dielectric structures 112-118 are arranged differently. For example, in FIGS. 2A, 2B, and 2C, the dielectric structures 112-118 are arranged in roughly an "L" shape such that an intersection point of the lines 210 and 212 is remote from the dielectric structures 112-118. In contrast, in FIG. 3, the dielectric structures 112-118 are arranged in roughly an "X" shape such that an intersection point of the lines 210 and 212 is between the dielectric structures 112-118. The arrangement illustrated in FIG. 3 can be used to reduce the size of the waveform detector 102 relative to the implementation of the waveform detector 102 illustrated in FIGS. 2A, 2B and 2C. For example, in FIG. 3, the dimensions D1 and D2 can be smaller than the dimensions D1 and D2 in FIG. 2A.

As a result of arranging the dielectric structures 112-118 in the X shape illustrated in FIG. 3, the dimension D6, corresponding to the distance between two unpaired dielectric structures (e.g., the first dielectric structure 112 and the fourth dielectric structure 118) is less than either the dimension D4 or the dimension D5. Accordingly, the unpaired dielectric structures are formed so as to limit electromagnetic coupling there between. For example, the materials, material properties, and/or geometry of the first dielectric structure 112 may be sufficiently different from the materials, material properties, and/or geometry of the fourth dielectric structure 118 such that little or no detectable electromagnetic coupling occurs between the first dielectric structure 112 and the fourth dielectric structure 118. Conversely, the materials, material properties, and/or geometry of the first dielectric structure 112 may be substantially identical to the materials, material properties, and/or geometry of the second dielectric structure 114 such that detectable electromagnetic coupling occurs between the first dielectric structure 112 and the second dielectric structure 114. Likewise, the materials, material properties, and/or geometry of the third dielectric structure 116 may be substantially identical to the materials, material properties, and/or geometry of the fourth dielectric structure 118 such that detectable electromagnetic coupling occurs between the third dielectric structure 116 and the fourth dielectric structure 118.

FIGS. 4A, 4B, 5A, and 5B illustrate various views of multi-angle implementations of waveform detectors of the system 100 of FIG. 1. In each of FIGS. 4A, 4B, 5A, and 5B, the waveform detector 102 is joined to or assembled with other waveform detectors to form a detector device capable of detecting electromagnetic waves over a broader range of directions of arrival than a single waveform detector could.

Figure 4A:
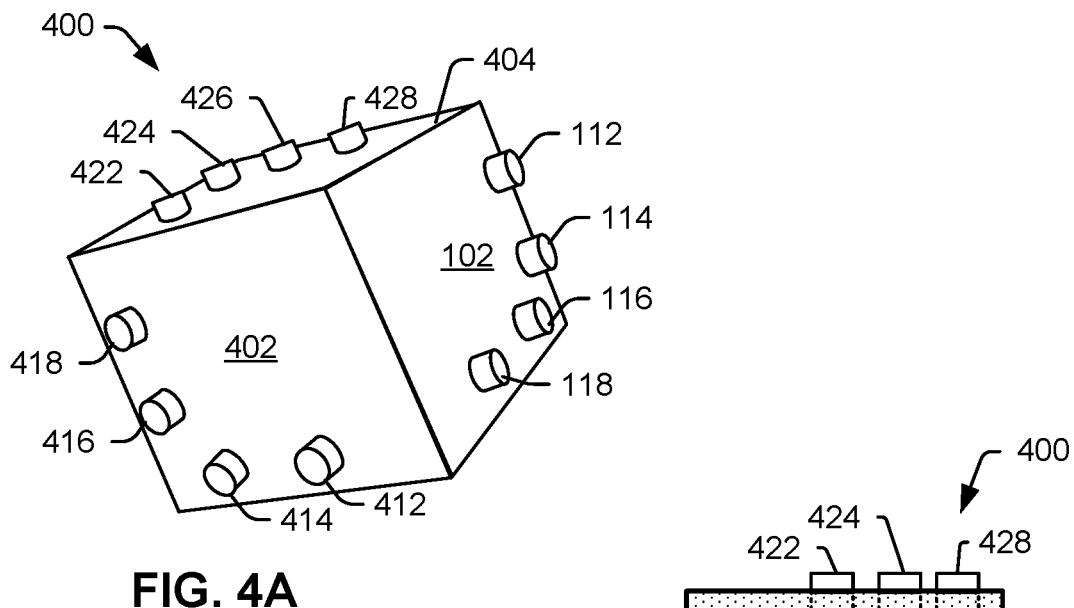
FIGS. 4A and 4B are diagrams illustrating various views of a waveform detector device according to a particular implementation.
Figure 4B:
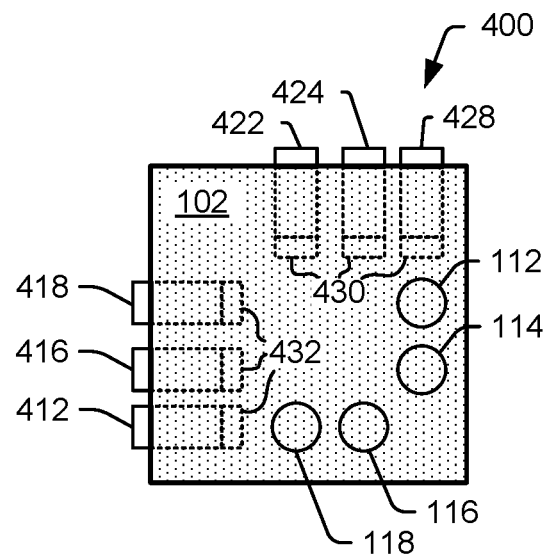

FIG. 4A illustrates a perspective view a detector device 400, and FIG. 4B illustrates a side view of the detector device 400. In FIGS. 4A and 4B, multiple waveform detectors 102, 402, 404 are arranges on external (or convex) faces of a three-dimensional (3D) object. In the implementation illustrated in FIGS. 4A and 4B, the 3D object is a cube; however, in other implementations, the waveform detectors 102, 402, 404 may be arranged on faces or surfaces of other 3D objects, such as a tetrahedron, a pyramid, an octahedron, a dodecahedron, an icosahedron, a sphere, a cylinder, etc.

Each of the waveform detectors 102, 402, 404 in FIGS. 4A and 4B includes at least two pairs of dielectric structures. For example, the waveform detector 402 includes dielectric structures 412 and 414 arranged as a coupled pair and dielectric structures 416 and 418 arranged as another coupled pair. Additionally, the waveform detector 404 includes dielectric structures 422 and 424 arranged as a coupled pair and dielectric structures 426 and 428 arranged as another coupled pair. In a particular implementation, the waveform detector 402 and the waveform detector 404 are each a copy of (e.g., additional instances of) the waveform detector 102. Thus, the waveform detectors 402, 404 have the same properties and structure as the waveform detector 102, and have different acceptance cones than the waveform detector 102 (and different acceptance cones than one another) as a result of being positions on a different face of the 3D object.

Although FIGS. 4A and 4B illustrate three waveform detectors 102, 402, 404 arranged on faces of the 3D object, in other implementations, the detector device 400 includes more than three waveform detectors or fewer than three waveform detectors. For example, the detector device 400 can include two waveform detectors on opposite or adjacent faces of a 3D object. In another example, the detector device 400 can include a waveform detector on each face of the 3D object. If the 3D object does not include faces (e.g., if the 3D object is a sphere), the two or more waveform detectors are arranged on portions of a surface of the 3D object that have different normal directions. Further, in some implementations, more than one waveform detector can be located on a single face or surface. For example, a single face or surface can include a first waveform detector configured to detect electromagnetic waves within a first wavelength range and a second waveform detector configured to detect electromagnetic waves within a second wavelength range, where the first wavelength range is different from (e.g., only partially overlaps or does not overlap) the second wavelength range.

In the implementation illustrated in FIG. 4B, sensors 432 are coupled to the dielectric structures 412-418 within a body of the detector device 400, and sensors 430 are coupled to the dielectric structures 422-428 within the body of the detector device 400. Further, although not shown in FIG. 4B, the sensors 132-138 are coupled to the dielectric structures 112-118 within the body of the detector device 400. For example, the body of the detector device 400 may include or be formed of the dielectric substrate 106 of FIG. 1. In this example, the sensors 132-138, 430, and 432 are embedded within the dielectric substrate and in contact with respective dielectric structures.

Figure 5A:
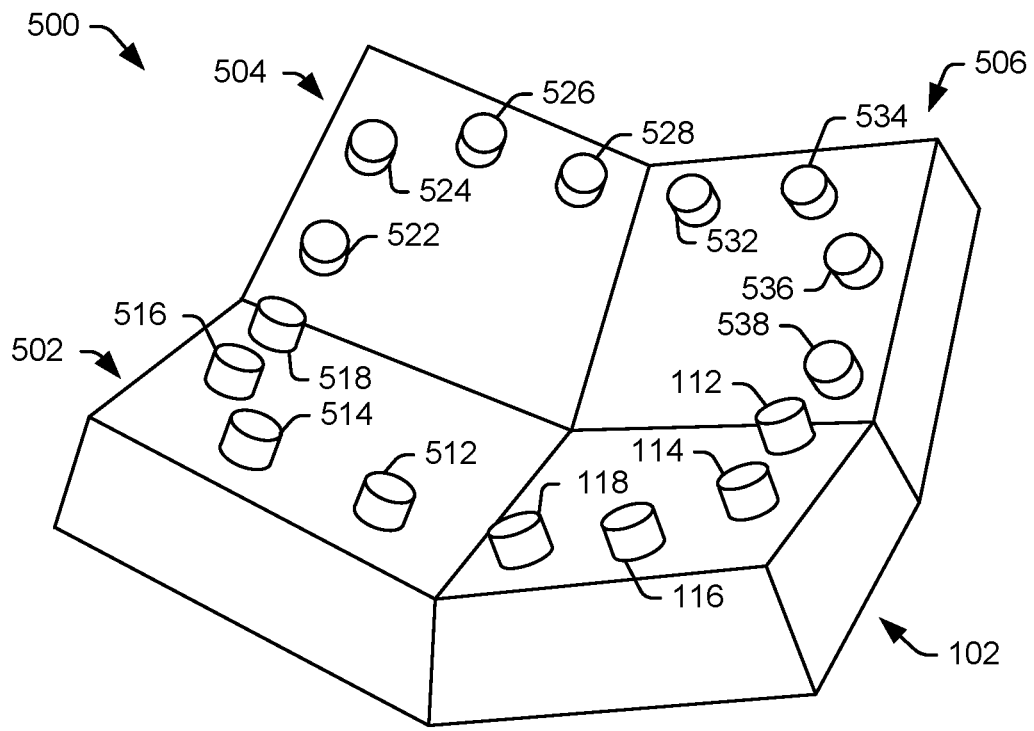
FIGS. 5A and 5B are diagrams illustrating various views of a waveform detector device according to a particular implementation.
Figure 5B:
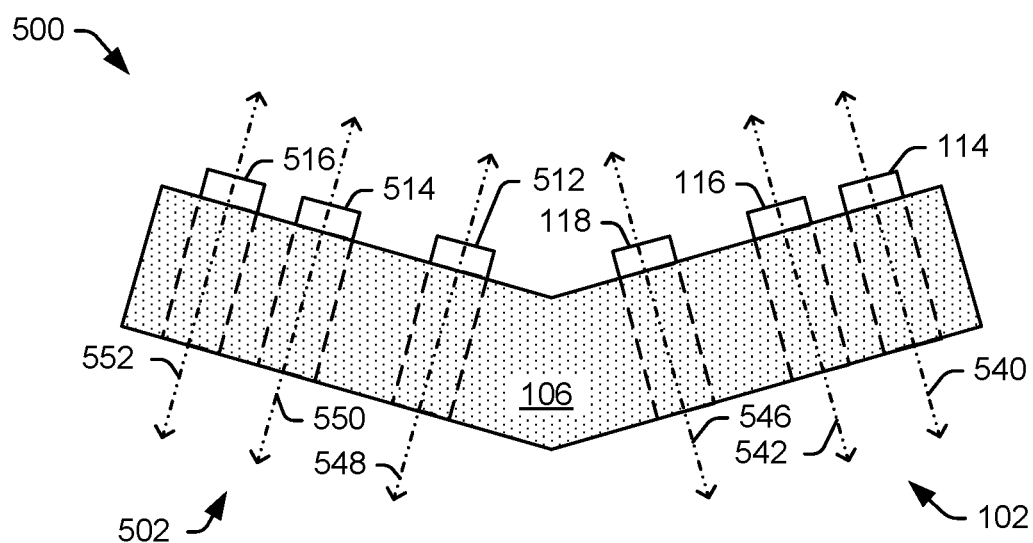

In FIGS. 5A and 5B, multiple waveform detectors 102, 502, 504, 506 are arranged on internal (or concave) faces of a three-dimensional (3D) object to form a detector device 500. In the implementation illustrated in FIGS. 5A and 5B, the 3D object includes four faces; however, in other implementations, the 3D object includes more than four faces or fewer than four faces. Further, although the faces of the 3D object are illustrated in FIGS. 5A and 5B as substantially planar, in other implementations, the 3D object includes curved surfaces (instead of or in addition to planar surfaces), and two or more of the waveform detectors 102, 502, 504, 506 are arranged on the curved surfaces.

Each of the waveform detectors 102, 502, 504, 506 in FIGS. 5A and 5B includes at least two pairs of dielectric structures. For example, the waveform detector 502 includes dielectric structures 512 and 514 arranged as a coupled pair and dielectric structures 516 and 518 arranged as another coupled pair. Additionally, the waveform detector 504 includes dielectric structures 522 and 524 arranged as a coupled pair and dielectric structures 526 and 528 arranged as another coupled pair. Further, the waveform detector 506 includes dielectric structures 532 and 534 arranged as a coupled pair and dielectric structures 536 and 538 arranged as another coupled pair. In a particular implementation, the waveform detectors 502, 504, 506 are each a copy of (e.g., additional instances of) the waveform detector 102. Thus, the waveform detectors 502, 504, 506 have the same properties and structure as the waveform detector 102, and have different acceptance cones than the waveform detector 102 (and different acceptance cones than one another) as a result of being positions on a different face of the 3D object.

The different orientations of the waveform detector 102 and the waveform detector 502 in the particular implementation illustrated in FIGS. 5A and 5B are illustrated in FIG. 5B. Each of the dielectric structures 114-118, 512-516 in FIG. 5B has a major axis that extends from a first face (on a first side of the dielectric substrate 106) to a second face (on a second side of the dielectric substrate 106) as illustrated by lines 540-542. For example, the line 540 corresponds to a line running through a major axis of the second dielectric structure 114, the line 542 corresponds to a line running through a major axis of the third dielectric structure 116, and the line 546 corresponds to a line running through a major axis of the fourth dielectric structure 118. Although not shown in FIG. 5B, a line extending through a major axis of the first dielectric structure 112 would be aligned with (e.g., underlie in the view shown in FIG. 5B) the line 540. Further, the line 548 corresponds to a line running through a major axis of the dielectric structure 512, the line 550 corresponds to a line running through a major axis of the dielectric structure 514, and the line 552 corresponds to a line running through a major axis of the dielectric structure 516. Although not shown in FIG. 5B, a line extending through a major axis of the dielectric structure 518 would be aligned with (e.g., underlie in the view shown in FIG. 5B) the line 552. The lines 540-546 are parallel with one another. Further, the lines 548-552 are parallel with one another. However, the lines 540-546 are not parallel with the lines 548-552.

Figure 6A:
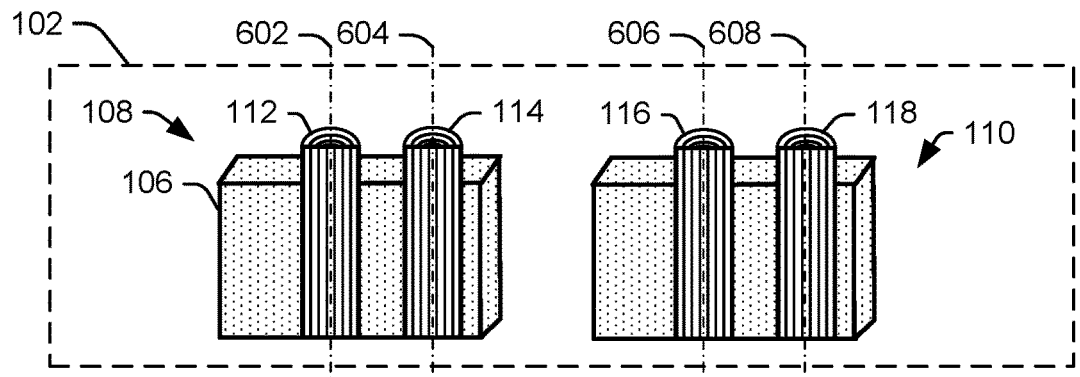
FIGS. 6A and 6B are diagrams illustrating power levels of a waveform detector of the system of FIG. 1 responsive to a first electromagnetic wave.

FIGS. 6A-6C and 7A-7C illustrate two examples of electromagnetic waves incident on a waveform detector 102 and determining the direction of arrival of each of the electromagnetic waves based on power levels in pairs of dielectric structures of the waveform detector 102. FIG. 6A shows the first dielectric structure 112 and the second dielectric structure 114 arranged to form the first pair 108 of dielectric structures and shows the third dielectric structure 116 and the fourth dielectric structure 118 arranged to form the second pair 110 of dielectric structures. Details regarding the arrangement of the pairs 108, 110 of dielectric structures relative to one another have been omitted from FIG. 6A. Accordingly, the waveform detector 102 of FIG. 6A can be arranged according to the L shape illustrated in FIGS. 2A and 2B, according to the X shape illustrated in FIG. 3, or according to another pattern. FIG. 7A illustrates the same waveform detector 102 as the waveform detector illustrated in FIG. 6A.

In both FIG. 6A and FIG. 7A, a power level of each dielectric structure 112-118 is illustrated by vertical lines within the respective dielectric structure 112-118, with more lines representing more power. For example, in FIG. 6A, the power levels of the dielectric structures 112-118 are equal; thus, each of the dielectric structures 112-118 has the same number of vertical lines. However, in FIG. 7A, the power levels of the dielectric structures 112-118 are not equal; thus, the third dielectric structure 116 has fewer vertical lines than the other dielectric structures 112, 114, 118, and the first and second dielectric structures 112, 114 have fewer vertical lines than the fourth dielectric structure 118.

FIGS. 6A, 6B, 7A, and 7B illustrate a center line of each dielectric structure 112-118 as an aid to representing the relative power level in each pair 108, 110 dielectric structures. The line 602 is a center line of the first dielectric structure 112, the line 604 is a center line of the second dielectric structure 114, the line 606 is a center line of the third dielectric structure 116, and the line 608 is a center line of the fourth dielectric structure 118.

Figure 6B:
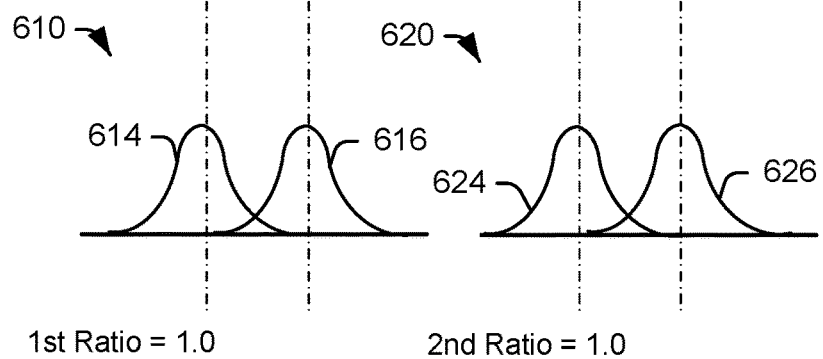
Figure 6C:
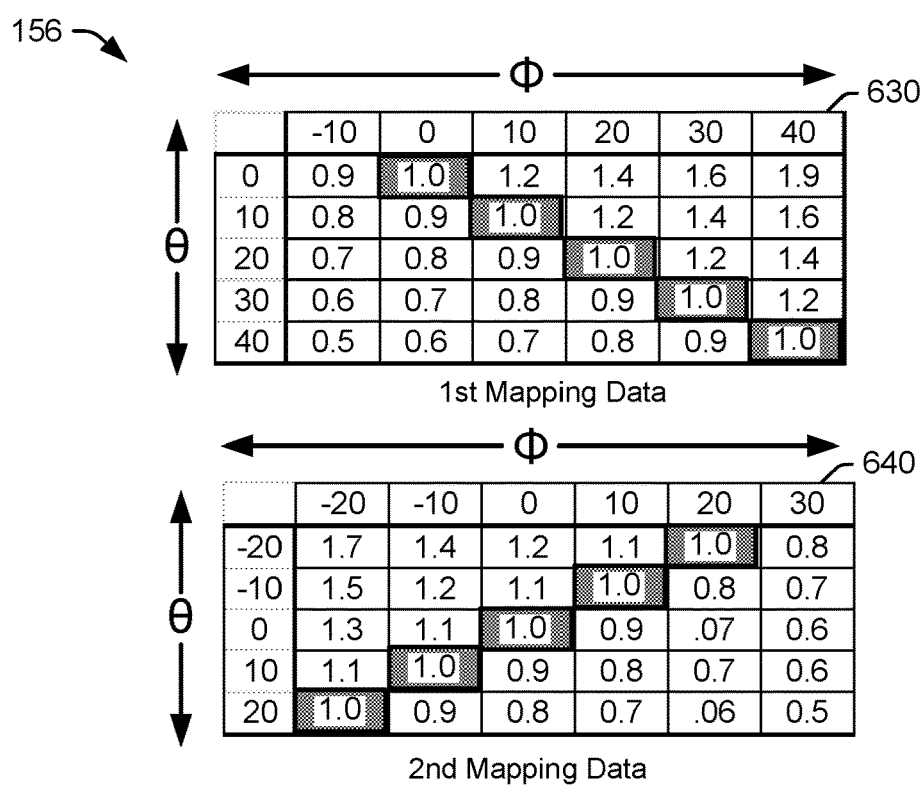
FIG. 6C is a diagram illustrating mapping data that maps the power levels of FIGS. 6A and 6B to directions of arrival of the first electromagnetic wave.

FIGS. 6A and 6B are diagrams illustrating power levels of the waveform detector 102 of the system 100 of FIG. 1 responsive to a first electromagnetic wave. FIG. 6C is a diagram illustrating mapping data that maps information indicative of the power levels of FIGS. 6A and 6B to directions of arrival of the first electromagnetic wave. In FIGS. 6A and 6B, the direction of arrival of the first electromagnetic wave is parallel to a normal of a surface of the waveform detector 102 (e.g., the direction of arrival of the first electromagnetic wave is $\varphi=0$ degrees and $\theta=0$ degrees). Stated another way, the first electromagnetic wave is coming from directly above the waveform detector 102.

FIGS. 7A and 7B are diagrams illustrating power levels of the waveform detector 102 of the system 100 of FIG. 1 responsive to a second electromagnetic wave. FIG. 7C is a diagram illustrating mapping data that maps information indicative of the power levels of FIGS. 7A and 7B to directions of arrival of the second electromagnetic wave. In FIGS. 7A and 7B, the direction of arrival of the second electromagnetic wave is non-parallel to the normal of the surface of the waveform detector. In the specific example illustrated in FIGS. 7A-7C, the direction of arrival of the second electromagnetic wave is φ=20 degrees and θ=20 degrees, as explained further below.

FIGS. 6B and 7B includes graphs representing power levels (e.g., power level ratios) for each pair 108, 110 of the dielectric structures. For example, in FIG. 6B, a first graph 610 includes a line 614 illustrating a first power level in the first dielectric structure 112 responsive to the first electromagnetic wave and a line 616 illustrating a second power level in the second dielectric structure 114 responsive to the first electromagnetic wave. An area under the curve of the line 614 and an area of the curve of the line 616 are approximately equal indicating that the first power level in the first dielectric structure 112 is approximately equal to the second power level of the second dielectric structure 114. Expressed as a ratio, the relative power level in the first pair 108 of dielectric structures responsive to the first electromagnetic wave is approximately 1.0.

Additionally, in FIG. 6B, a second graph 620 includes a line 624 illustrating the third power level in the third dielectric structure 116 responsive to the first electromagnetic wave and a line 624 illustrating a fourth power level in the fourth dielectric structure 118 responsive to the first electromagnetic wave. An area under the curve of the line 624 and an area under the curve of the line 626 are approximately equal indicating that the third power level in the third dielectric structure 116 is approximately equal to the fourth power level of the fourth dielectric structure 118. Expressed as a ratio, the relative power level in the second pair 110 of dielectric structures responsive to the first electromagnetic wave is approximately 1.0.

The mapping data 156 of FIG. 6C including first mapping data 630 and second mapping data 640. The mapping data 156 maps data indicative of the relative power levels in the pairs 108, 110 of dielectric structures to sets of angles (e.g., φ, Θ) corresponding to a direction of arrival. The direction of arrival of the first electromagnetic wave is indicated by a set of angles at which the first mapping data 630 and the second mapping data 640 intersect. For example, in FIG. 6C, the first mapping data 630 indicates that a power level ratio of 1.0 for the first pair 108 of dielectric structures corresponds to pairs of angles (0, 0), (10, 10), (20, 20), (30, 30), or (40, 40), and the second mapping data 640 indicates that a power level ratio of 1.0 for the second pair 110 of dielectric structures corresponds to pairs of angles (20, −20), (10, −10), (0, 0), (−10, 10), and (−20, 20). Thus, the first mapping data 630 and the second mapping data 640 intersect (or agree) at the pair of angles (0, 0), indicating that the direction of arrival of the first electromagnetic wave is from a direction corresponding to φ=0 degrees and Θ=0 degrees.

As another example, in FIG. 7B, a first graph 710 includes a line 714 illustrating the first power level in the first dielectric structure 112 responsive to the second electromagnetic wave and a line 716 illustrating the second power level in the second dielectric structure 114 responsive to the second electromagnetic wave. An area under the curve of the line 714 and an area under the curve of the line 716 are approximately equal indicating that the first power level in the first dielectric structure 112 is approximately equal to the second power level of the second dielectric structure 114. Expressed as a ratio, the relative power level in the first pair 108 of dielectric structures responsive to the second electromagnetic wave is approximately 1.0.

Additionally, in FIG. 7B, a second graph 720 includes a line 724 illustrating the third power level in the third dielectric structure 116 responsive to the second electromagnetic wave and a line 726 illustrating the fourth power level in the fourth dielectric structure 118 responsive to the second electromagnetic wave. An area under the curve of the line 724 is smaller than an area under the curve of the line 726 indicating that the third power level in the third dielectric structure 116 is less than the fourth power level of the fourth dielectric structure 118. Expressed as a ratio, the relative power level in the second pair 110 of dielectric structures responsive to the second electromagnetic wave is approximately 0.6.

In FIG. 7C, the first mapping data 630 indicates that a power level ratio of 1.0 for the first pair 108 of dielectric structures corresponds to pairs of angles (0, 0), (10, 10), (20, 20), (30, 30), or (40, 40), and the second mapping data 640 indicates that a power level ratio of 0.6 for the second pair 110 of dielectric structures corresponds to pairs of angles (30, 0), (30, 10), (20, 20), (10, 30), or (0, 40). Thus, the first mapping data 630 and the second mapping data 640 intersect (or agree) at the pair of angles (20, 20), indicating that the direction of arrival of the second electromagnetic wave is from a direction corresponding to φ=20 degrees and Θ=20 degrees.

Note that the data indicative of the power levels in the pairs 108, 110 of dielectric structures can include directly or indirectly measured power levels, or can include measure values that are correlated with power level, such as changes in optical properties (e.g., changing in refractive index), changes in dimensions (e.g., elongation), etc.

Figure 8:
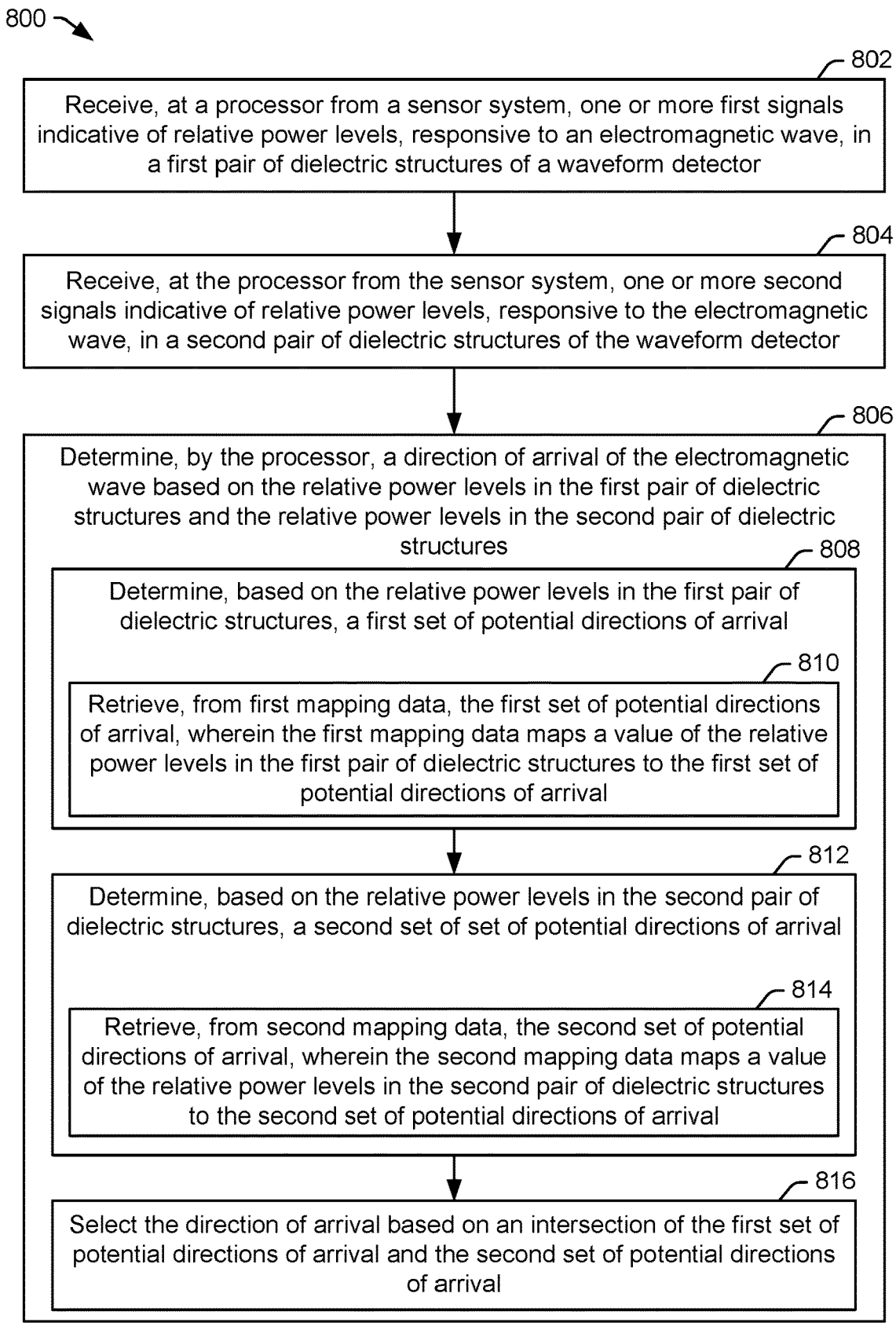
FIG. 8 is a flow chart illustrating a particular embodiment of a method of operation of the system of FIG. 1.

FIG. 8 is a flow chart illustrating a particular embodiment of a method 800 of operation of the system 100 of FIG. 1. For example, the method 800 may be performed by the processing circuitry 152 of FIG. 1. The method 800 includes, at 802, receiving (e.g., at a processor from a sensor system) one or more first signals indicative of relative power levels, responsive to an electromagnetic wave, in a first pair of dielectric structures of a waveform detector. For example, the one or more first signals may correspond to the first signal 142 and the second signal 144, which together indicate the relative power levels in the first pair 108 of dielectric structures. Alternatively, in some implementations, the detection circuitry 120 may send a single signal indicating the relative power levels in the first pair 108 of dielectric structures to the computing device 150.

The method 800 also includes, at 804, receiving (e.g., at the processor from the sensor system) one or more second signals indicative of relative power levels, responsive to the electromagnetic wave, in a second pair of dielectric structures of the waveform detector. For example, the one or more second signals may correspond to the third signal 146 and the fourth signal 148, which together indicate the relative power levels in the second pair 110 of dielectric structures. Alternatively, in some implementations, the detection circuitry 120 may send a single signal indicating the relative power levels in the second pair 110 of dielectric structures to the computing device 150.

The method 800 also includes, at 806, determining a direction of arrival of the electromagnetic wave based on the relative power levels in the first pair of dielectric structures and the relative power levels in the second pair of dielectric structures. In a particular implementation, determining the direction of arrival of the electromagnetic wave includes, at 808, determining, based on the relative power levels in the first pair of dielectric structures, a first set of potential directions of arrival. For example, as described with reference to FIGS. 6C and 7C, the first set of potential directions of arrival may be determined by retrieving, from first mapping data, the first set of potential directions of arrival, where the first mapping data maps a value of the relative power levels in the first pair of dielectric structures to the first set of potential directions of arrival, at 810.

In this implementation, determining the direction of arrival of the electromagnetic wave also includes, at 812, determining, based on the relative power levels in the second pair of dielectric structures, a second set of set of potential directions of arrival. For example, as described with reference to FIGS. 6C and 7C, the second set of potential directions of arrival may be determined by retrieving, from second mapping data, the second set of potential directions of arrival, where the second mapping data maps a value of the relative power levels in the second pair of dielectric structures to the second set of potential directions of arrival, at 814. In this implementation, the method 800 further includes, at 816, selecting the direction of arrival based on an intersection of the first set of potential directions of arrival and the second set of potential directions of arrival.

Embodiments described above are illustrative and do not limit the disclosure. It is to be understood that numerous modifications and variations are possible in accordance with the principles of the present disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A system for direction of arrival determination, the system comprising:
    a waveform detector comprising:
        a first pair of dielectric structures comprising a first dielectric structure and a second dielectric structure; and
        a second pair of dielectric structures comprising a third dielectric structure and a fourth dielectric structure, wherein major axes of the first dielectric structure, the second dielectric structure, the third dielectric structure, and the fourth dielectric structure are substantially parallel;
    a second waveform detector comprising:
        a third pair of dielectric structures comprising a fifth dielectric structure and a sixth dielectric structure; and
        a fourth pair of dielectric structures comprising a seventh dielectric structure and an eighth dielectric structure, wherein major axes of the fifth dielectric structure, the sixth dielectric structure, the seventh dielectric structure, and the eighth dielectric structure are substantially parallel, and are nonparallel with the major axes of the first dielectric structure, the second dielectric structure, the third dielectric structure, and the fourth dielectric structure; and
    processing circuitry configured to:
        determine a direction of arrival of an electromagnetic wave incident on the waveform detector, the direction of arrival determined based on relative power levels in the first pair of dielectric structures responsive to the electromagnetic wave, and based on relative power levels in the second pair of dielectric structures responsive to the electromagnetic wave; and
        determine a second direction of arrival of a second electromagnetic wave incident on the second waveform detector, the second direction of arrival determined based on relative power levels in the third pair of dielectric structures responsive to the second electromagnetic wave and based on relative power levels in the fourth pair of dielectric structures responsive to the second electromagnetic wave.

2. The system of claim 1, further comprising detection circuitry coupled to the processing circuitry, the detection circuitry configured to generate one or more first signals indicative of the relative power levels in the first pair of dielectric structures responsive to the electromagnetic wave and to generate one or more second signals indicative of the relative power levels in the second pair of dielectric structures responsive to the electromagnetic wave, wherein the processing circuitry determines the direction of arrival of the electromagnetic wave based on the one or more first signals and the one or more second signals.

3. The system of claim 2, wherein the detection circuitry includes:
    a first sensor configured to generate a first signal indicative of a first power level, responsive to the electromagnetic wave, in the first dielectric structure;
    a second sensor configured to generate a second signal indicative of a second power level, responsive to the electromagnetic wave, in the second dielectric structure;
    a third sensor configured to generate a third signal indicative of a third power level, responsive to the electromagnetic wave, in the third dielectric structure; and
    a fourth sensor configured to generate a fourth signal indicative of a fourth power level, responsive to the electromagnetic wave, in the fourth dielectric structure,
    wherein the relative power levels in the first pair of dielectric structures corresponds to a ratio based on the first signal and the second signal, and
    wherein the relative power levels in the second pair of dielectric structures corresponds to a ratio based on the third signal and the fourth signal.

4. The system of claim 2, further comprising a memory accessible to the processing circuitry, the memory storing first mapping data that maps values of the one or more first signals to first angles of arrival and storing second mapping data that maps values of the one or more second signals to second angles of arrival, wherein the processing circuitry determines the direction of arrival based on the first mapping data and the second mapping data.

5. The system of claim 1, wherein the waveform detector further comprises a dielectric substrate, wherein the first pair of dielectric structures and the second pair of dielectric structures are at least partially embedded within the dielectric substrate.

6. The system of claim 5, wherein each dielectric structure of the first pair of dielectric structures and the second pair of dielectric structures has a relative permittivity greater than a relative permittivity of the dielectric substrate.

7. The system of claim 5, wherein each dielectric structure of the first pair of dielectric structures and the second pair of dielectric structures has a refractive index that is greater than a refractive index of the dielectric substrate.

8. The system of claim 5, wherein each dielectric structure of the first pair of dielectric structures and the second pair of dielectric structures includes a portion that extends external to the dielectric substrate.

9. The system of claim 1, wherein dielectric structures of at least one of the first pair of dielectric structures or the second pair of dielectric structures includes strontium titanate ($SrTiO_3$).

10. The system of claim 1, wherein the second dielectric structure is substantially phase matched with the first dielectric structure.

11. The system of claim 1, wherein the fourth dielectric structure is substantially phase matched with the third dielectric structure.

12. The system of claim 1, wherein the first dielectric structure has a first size and a first shape, wherein the second dielectric structure has a second size and a second shape, wherein the first size is substantially equal to the second size, and wherein the first shape is geometrically similar to the second shape.

13. The system of claim 1, wherein the third dielectric structure has a third size and a third shape, wherein the fourth dielectric structure has a fourth size and a fourth shape, wherein the third size is substantially equal to the fourth size, and wherein the third shape is geometrically similar to the fourth shape.

14. The system of claim 1, wherein the second dielectric structure is disposed within a threshold distance from the first dielectric structure, and wherein the threshold distance corresponds to a coupling distance for the electromagnetic wave.

15. The system of claim 14, wherein the fourth dielectric structure is disposed within the threshold distance from the third dielectric structure.

16. The system of claim 1, wherein the direction of arrival of the electromagnetic wave is within a first polar range and within a first azimuth angle range and the second direction of arrival of the second electromagnetic wave is within a second polar range and within a second azimuth angle range, and wherein the a first polar range is different than the a second polar range and the first azimuth angle range is different than the second azimuth angle range.

17. A waveform detector comprising:
a first pair of dielectric structures comprising a first dielectric structure disposed within a threshold distance of a second dielectric structure;
a second pair of dielectric structures comprising a third dielectric structure disposed within the threshold distance of a fourth dielectric structure, the threshold distance such that relative power levels, responsive to an electromagnetic wave, in the first pair of dielectric structures are related to a direction of arrival of the electromagnetic wave and relative power levels, responsive to the electromagnetic wave, in the second pair of dielectric structures are related to the direction of arrival of the electromagnetic wave, wherein major axes of the first dielectric structure, the second dielectric structure, the third dielectric structure, and the fourth dielectric structure are substantially parallel;
a third pair of dielectric structures comprising a fifth dielectric structure and a sixth dielectric structure; and
a fourth pair of dielectric structures comprising a seventh dielectric structure and an eighth dielectric structure, wherein major axes of the fifth dielectric structure, the sixth dielectric structure, the seventh dielectric structure, and the eighth dielectric structure are substantially parallel, and are nonparallel with the major axes of the first dielectric structure, the second dielectric structure, the third dielectric structure, and the fourth dielectric structure.

18. The waveform detector of claim 17, further comprising a dielectric substrate, wherein the first pair of dielectric structures and the second pair of dielectric structures are at least partially embedded within the dielectric substrate.

19. The waveform detector of claim 18, wherein each of the first dielectric structure, the second dielectric structure, the third dielectric structure, and the fourth dielectric structure has a relative permittivity greater than a relative permittivity of the dielectric substrate.

20. The waveform detector of claim 18, wherein each of the first dielectric structure, the second dielectric structure, the third dielectric structure, and the fourth dielectric structure has a refractive index that is greater than a refractive index of the dielectric substrate.

21. The waveform detector of claim 18, wherein each of the first dielectric structure, the second dielectric structure, the third dielectric structure, and the fourth dielectric structure includes a portion that extends external to the dielectric substrate.

22. The waveform detector of claim 17, wherein each of the first dielectric structure, the second dielectric structure, the third dielectric structure, and the fourth dielectric structure includes strontium titanate ($SrTiO_3$).

23. The waveform detector of claim 17, wherein the first dielectric structure is substantially phase matched with the second dielectric structure and the third dielectric structure is substantially phase matched with the fourth dielectric structure.

24. The waveform detector of claim 17, wherein the threshold distance corresponds to a coupling distance for the electromagnetic wave.

25. A method of direction of arrival determination, the method comprising:
receiving, at a processor from a sensor system, one or more first signals indicative of relative power levels, responsive to an electromagnetic wave, in a first pair of dielectric structures of a waveform detector, wherein the first pair of dielectric structures includes a first dielectric structure and a second dielectric structure;
receiving, at the processor from the sensor system, one or more second signals indicative of relative power levels, responsive to the electromagnetic wave, in a second pair of dielectric structures of the waveform detector, wherein the second pair of dielectric structures includes a third dielectric structure and a fourth dielectric structure, and wherein major axes of the first dielectric structure, the second dielectrics structure, the third dielectric structure, and the fourth dielectric structure are substantially parallel;

determining, by the processor, a direction of arrival of the electromagnetic wave based on the relative power levels in the first pair of dielectric structures and the relative power levels in the second pair of dielectric structures;

receiving, at the processor from the sensor system, one or more third signals indicative of relative power levels, responsive to a second electromagnetic wave, in a third pair of dielectric structures of a second waveform detector, wherein the third pair of dielectric structures includes a fifth dielectric structure and a sixth dielectric structure;

receiving, at the processor from the sensor system, one or more fourth signals indicative of relative power levels, responsive to the second electromagnetic wave, in a fourth pair of dielectric structures of the second waveform detector, wherein the fourth pair of dielectric structures includes a seventh dielectric structure and an eighth dielectric structure, and wherein major axes of the fifth dielectric structure, the sixth dielectrics structure, the seventh dielectric structure, and the eighth dielectric structure are substantially parallel, and are nonparallel with the major axes of the first dielectric structure, the second dielectric structure, the third dielectric structure, and the fourth dielectric structure; and determining, by the processor, a second direction of arrival of the second electromagnetic wave based on the relative power levels in the third pair of dielectric structures and the relative power levels in the fourth pair of dielectric structures.

26. The method of claim 25, wherein determining the direction of arrival of the electromagnetic wave comprises:
  determining, based on the relative power levels in the first pair of dielectric structures, a first set of potential directions of arrival;
  determining, based on the relative power levels in the second pair of dielectric structures, a second set of potential directions of arrival; and
  selecting the direction of arrival based on an intersection of the first set of potential directions of arrival and the second set of potential directions of arrival.

27. The method of claim 26, wherein determining the first set of potential directions of arrival comprises retrieving, from first mapping data, the first set of potential directions of arrival, wherein the first mapping data maps a value of the relative power levels in the first pair of dielectric structures to the first set of potential directions of arrival, and wherein determining the second set of potential directions of arrival comprises retrieving, from second mapping data, the second set of potential directions of arrival, wherein the second mapping data maps a value of the relative power levels in the second pair of dielectric structures to the second set of potential directions of arrival.

* * * * *